Nov. 16, 1937.  E. E. WATSON  2,099,549
BALL AND SOCKET COUPLING
Filed April 14, 1937
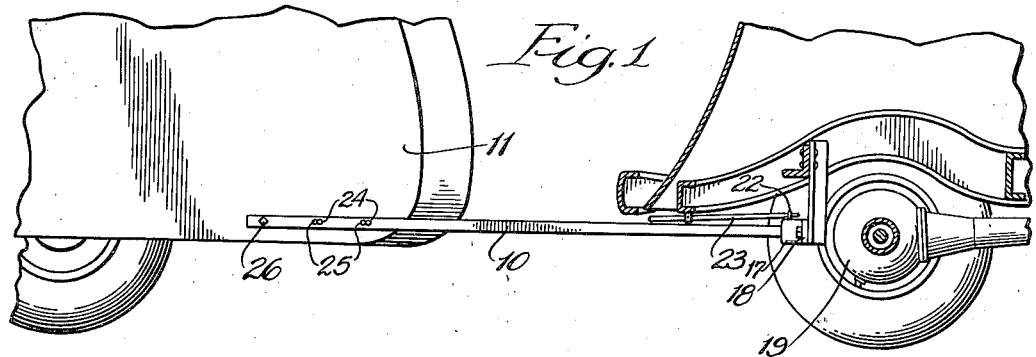
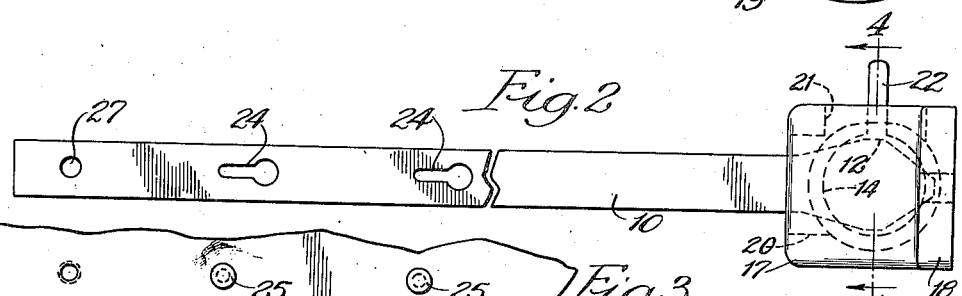
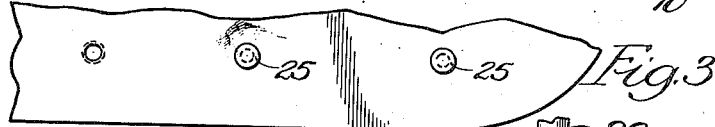
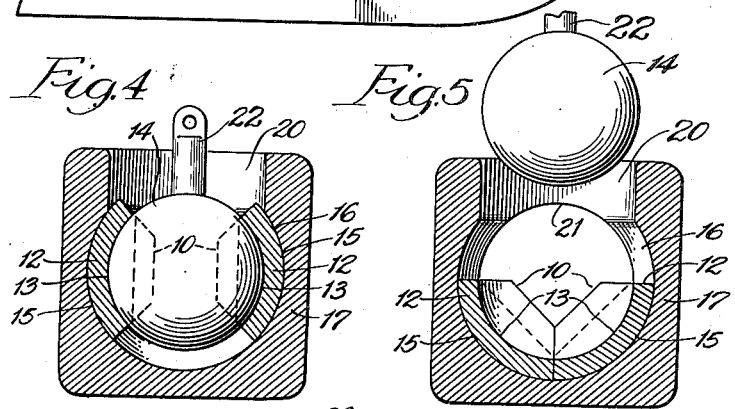
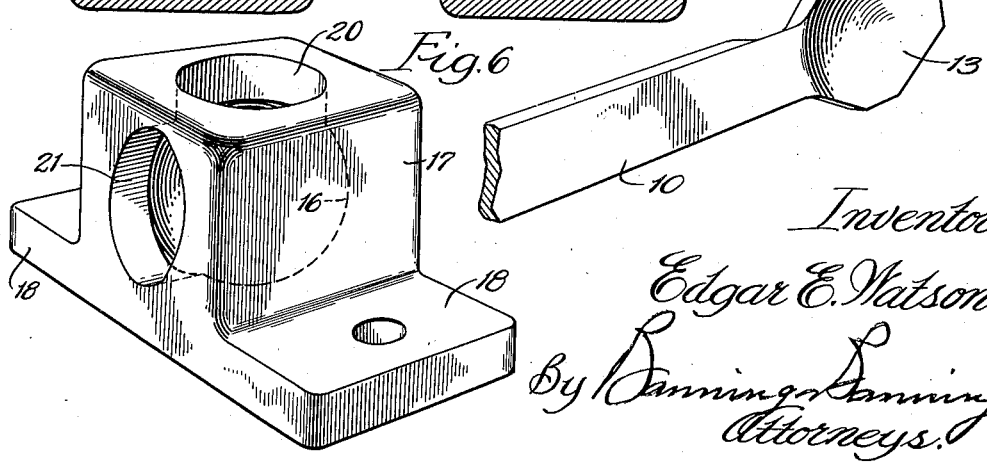
Inventor:
Edgar E. Watson,
By Banning & Banning
Attorneys.

Patented Nov. 16, 1937

2,099,549

UNITED STATES PATENT OFFICE 2,099,549

BALL AND SOCKET COUPLING

Edgar E. Watson, Waterloo, Iowa, assignor to The Metalectric Corporation, Waterloo, Iowa, a corporation of Iowa Application April 14, 1937, Serial No. 136,768

6 Claims. (Cl. 280—33.15)

The coupling of the present invention is designed particularly, though not exclusively, for use as a hitch between an automobile and a trailer, and the invention in particular relates to the form and arrangement of the ball and socket connection which affords a swivel mounting which is preferably located in close proximity to the differential of the automobile and is secured and locked in such a way as to permit the necessary freedom of movement, without, however, permitting accidental disengagement of the parts.

Further objects and details of the invention will appear from a description thereof, in conjunction with the accompanying drawing, wherein,—

Figure 1 is a side elevation of the coupling showing the rear end of an automobile and the forward end of the trailer;

Fig. 2 is an enlarged side elevation of the coupling members;

Fig. 3 is a fragmental detail of the forward end of the trailer showing the sides which are adapted to have the draft bars connected thereto;

Fig. 4 is a sectional elevation taken on line 4—4 of Fig. 2 showing the ball and socket members in assembled and locked relation;

Fig. 5 is a similar view showing the parts in unlocked position;

Fig. 6 is a perspective view of the socket block; and

Fig. 7 is a perspective view of the forward end of one of the draft bars.

The coupling comprises a pair of draft bars 10 of which one only is shown in Fig. 1, which draft bars are secured at their rear ends to the sides of the trailer 11 or to other convenient structural elements upon which a firm and rigid mounting can be made. The two draft bars converge forwardly, and each is provided at its forward end with a spoon shaped head 12 of cancavo-convex formation, the inner dished surface 13 being spherically configured to contact the spherical surface of a ball 14, and the outer convex face 15 of the spoon shaped head being spherically curved to snugly lie within the confines of a spherical socket recess 16 in a socket block 17 of cubical formation.

The socket block is provided with base flanges 18 which, in conjunction with the face of the block itself, furnish an extended base for attachment to a suitable portion of the framework of the car chassis in a position closely adjacent to the differential 19, so that the pivotal movements of the trailer will center approximately at or near the differential.

The socket block is provided on what may be termed its outer side with a circular aperture 20 of a size just sufficient to permit the ball 14 to slip easily therethrough, the diameter of said aperture being less than the diameter of the spherical socket recess 16. A similar aperture 21 is provided on one of the side faces and at a 90° angle to the aperture 20. The configuration and arrangement of the apertures 20 and 21, and the configuration of the socket recess 16, are such as to permit the two spoon shaped head members 12 of the draft bars, when turned inwardly toward one another and in closely contiguous relation with their dished faces in opposed relation, to be slipped through either the aperture 20 or the aperture 21, as the case may be, after which the dished faces will be adjusted to the right angular position shown in Fig. 5, which brings their outer spherical convex faces into registering alignment, so that these faces will contact substantially half of the spherical surface of the socket recess and present a half spherical concavity toward the remaining aperture 20 (or 21 as the case may be) through which the ball may be inserted to lie within the half spherical concavity thus presented by the spoon shaped heads of the draft bars. This is the condition of the parts after the ball has been lowered from the position shown in Fig. 5 to occupy the cavity thus presented.

After the ball has been inserted, the spoon shaped heads are each moved through an arc of 90° to occupy the opposed relation shown in Fig. 4, and this is the only position that these parts may occupy when the draft bars are laid sidewise against the sides of the trailer or trailer frame to which they are to be connected. With the parts thus held, it will be impossible to remove the ball from between the spoon shaped heads of the draft bars, or to remove the draft bars from the socket block, but at the same time the draft bars will swivel freely within the socket block by reason of the uniformity of curvature of the contacting surfaces, the ball being held and clamped within the spoon shaped heads of the draft bars and movable therewith.

The 90° separation of the apertures 20 and 21 enables either of these apertures to serve for the reception of the draft bars and the other to serve for the insertion of the ball, so that it is thus possible to mount the socket block either with the aperture 20 presented outwardly as in Fig. 1, or with the aperture 21 thus presented, depending upon the manner in which the socket block may be most conveniently and securely attached to the frame of the automobile. In either event, the ball receiving aperture will be presented upwardly, and in order to make provision for the convenient and expeditious lifting or lowering of the ball, the latter is provided with a stem 22, which extends upwardly from the associated aperture, and, if convenient operation so requires, a lever or like operative connection 23 may be provided for the lifting of the ball from an easily accessible point.

In order to insure against any displacement or twisting of the draft bars, a suitable connection is provided which, as shown, comprises key hole slots 24 which are adapted to coact with headed studs 25 on the side of the trailer frame or other convenient point of attachment, which permit the bars 10 to be mounted upon the headed studs and afterwards drawn forwardly to bring the reduced ends of the slots into register with the studs, after which a bolt 26 may be inserted through an aperture 27 to hold the rear ends of the draft bars securely against displacement. At the same time the arrangement is one which permits the draft bars to be readily disconnected from the trailer in order to turn them to the required position to permit the spoon shaped heads to be withdrawn from the socket block after the ball has been removed.

The device as a whole is one which affords an extremely rigid and rugged connection, and at the same time permits the necessary freedom of swiveling action in the ball and socket connection thus afforded. The socket thus provided is formed integrally from a single block, which may be of hardened steel, so that an unbroken spherical surface is presented for the swiveling movements, and the possibility of displacement of the parts is obviated, with the result that a close and accurate fitting of the parts may be maintained without any danger of binding, cramping, or excessive wear.

Although the invention has been described as a connection between an automobile and a trailer, it is obvious that the draft elements may be otherwise employed under conditions which require a ball and socket joint which is capable of ready disconnection of parts from time to time, and that the parts defined as draft bars may, if desired, be employed to function other than strictly as draft elements. It will therefore be understood that the invention resides primarily in the construction provided for affording a swiveling connection rather than in the particular use for which the connected elements are employed.

I claim:

1. In a ball and socket connection of the character described, the combination of a socket block provided in its interior with a spherically walled socket recess having two apertures communicating therewith in angular relation to one another, a plurality of connecting elements each provided with a spoon shaped head of concavo convex formation, the outer surfaces of said heads being adapted to swivel within the socket recess and the inner surfaces being dished and the heads being adapted when in closely adjacent opposed relation to one another with their concaved surfaces presented inwardly to be inserted through one of the apertures in the socket block, and a ball shaped locking member adapted to be inserted through the other aperture when the heads in conjunction are moved to a position such as to present their concaved inner surfaces toward the ball, said heads being thereafter adjustable to positions to embrace the ball on opposite sides to effect an interlock of the ball and spoon shaped heads within the socket block.

2. In a ball and socket connection of the character described, the combination of a socket block provided on its interior with a spherically walled socket recess having two apertures communicating therewith in angular relation to one another, a plurality of connecting elements each provided with a spoon shaped head of concavo convex formation, the outer surfaces of said heads being adapted to swivel within the socket recess and the inner surfaces being dished and the heads being adapted when in closely adjacent opposed relation to one another with their concaved surfaces presented inwardly to be inserted through one of the apertures in the socket block, and a ball shaped locking member adapted to be inserted through the other aperture when the heads in conjunction are moved to a position such as to present their concaved inner surfaces toward the ball, said heads being thereafter adjustable to positions to embrace the ball on opposite sides to effect an interlock of the ball and spoon shaped heads within the socket block, and means for detachably securing the outer ends of the connecting members against twisting movements to maintain the swiveling elements in interlocked relation.

3. In a ball and socket connection of the character described, the combination of a socket block provided on its interior with a spherically walled socket recess having two apertures communicating therewith in angular relation to one another, a plurality of connecting elements each provided with a spoon shaped head of concavo-convex formation, the outer surfaces of said heads being adapted to swivel within the socket recess and the inner surfaces being dished and the heads being adapted when in closely adjacent opposed relation to one another with their concaved surfaces presented inwardly to be inserted through one of the apertures in the socket block, and a ball shaped locking member adapted to be inserted through the other aperture when the heads in conjunction are moved to a position such as to present their concaved inner surfaces toward the ball, said heads being thereafter adjustable to positions to embrace the ball on opposite sides to effect an interlock of the ball and spoon shaped heads within the socket block, means for detachably securing the outer ends of the connecting members against twisting movements to maintain the swiveling elements in interlocked relation, and means for lifting the ball from the socket block when the spoon shaped heads are turned to position to release the ball.

4. In a draft connection of the character described, the combination of a socket block having formed on its interior a spherical recess and having two circular apertures communicating with the recess and standing in right angle relation to one another, a pair of draft bars each provided at one end with a spoon shaped concavo-convex head having its inner and outer surfaces spherically and concentrically curved and the outer surface having a curvature coincident with the curvature of the socket recess and the inner surface having a radius substantially equal to the radius of the circular apertures, and a spherical locking ball having a radius substantially equal to the radius of curvature of the inner faces of the spoon shaped heads and adapted to be entered through either of the apertures, the other aperture permitting the spoon shaped heads when in opposed closely contiguous relation to one another, with their concaved surfaces presented inwardly, to be entered therethrough, and the parts being configured to permit the spoon shaped heads to be thereafter spread to present in conjunction a hemispherical recess for the reception of the locking ball and to be thereafter moved to opposed relation to embrace the ball and prevent its removal, and the parts when adjusted to embrace the ball affording a swivel connection for the spoon shaped heads.

5. In a draft connection of the character described, the combination of a socket block having formed on its interior a spherical recess and having two circular apertures communicating with the recess and standing in right angle relation to one another, a pair of draft bars each provided at one end with a spoon shaped concavo-convex head having its inner and outer surfaces spherically and concentrically curved and the outer surface having a curvature coincident with the curvature of the socket recess and the inner surface having a radius substantially equal to the radius of the circular apertures, and a spherical locking ball having a radius substantially equal to the radius of curvature of the inner faces of the spoon shaped heads and adapted to be entered through either of the apertures, the other aperture permitting the spoon shaped heads when in opposed closely contiguous relation to one another, with their concaved surfaces presented inwardly, to be entered therethrough, and the parts being configured to permit the spoon shaped heads to be thereafter spread to present in conjunction a hemispherical recess for the reception of the locking ball and to be thereafter moved to opposed relation to embrace the ball and prevent its removal, and the parts when adjusted to embrace the ball affording a swivel connection for the spoon shaped heads, and means for removably securing the draft bars against twisting movement.

6. In a connection of the character described, the combination of a socket block provided on its interior with a curvedly walled socket recess having an aperture communicating therewith, a plurality of connecting elements each provided with a head having a convexly curved exterior surface adapted to swivel upon the curved surface of the socket recess, and a dished inner surface, and the heads being adapted when in closely adjacent relation with their dished surfaces presented inwardly to be inserted through the aperture in the socket block and adapted thereafter to be spread to enlarge the space afforded between their dished surfaces, and a locking member adapted to be inserted to lie within the enlarged space thus afforded and configured to thereafter permit the heads to be turned within the curvedly walled socket recess to a position to embrace the locking member and prevent its removal and to likewise prevent removal of the heads of the connecting elements from the socket recess while the locking member is in place, the locking member thus positioned holding the heads in swiveling relation to the socket recess.

EDGAR E. WATSON.